(No Model.) 6 Sheets—Sheet 1.
M. N. LOVELL.
CASH REGISTER AND INDICATOR.
No. 489,382. Patented Jan. 3, 1893.

Witnesses
E. F. Spaulding
Will Marks.

Inventor
Melvin N. Lovell
by Hallock & Hallock
Attys.

(No Model.)
6 Sheets—Sheet 2.

M. N. LOVELL.
CASH REGISTER AND INDICATOR.

No. 489,382. Patented Jan. 3, 1893.

Witnesses:
E. F. Spaulding
Will Marks.

Inventor.
Melvin N. Lovell
by Hallock & Hallock
Attys (No Model.) 6 Sheets—Sheet 5.

M. N. LOVELL.
CASH REGISTER AND INDICATOR.

No. 489,382. Patented Jan. 3, 1893.

Witnesses:
E. F. Spaulding
Will Marks

Inventor.
Melvin N Lovell
by Hallock & Hallock
Attys (No Model.) 6 Sheets—Sheet 6.
M. N. LOVELL.
CASH REGISTER AND INDICATOR.
No. 489,382. Patented Jan. 3, 1893.
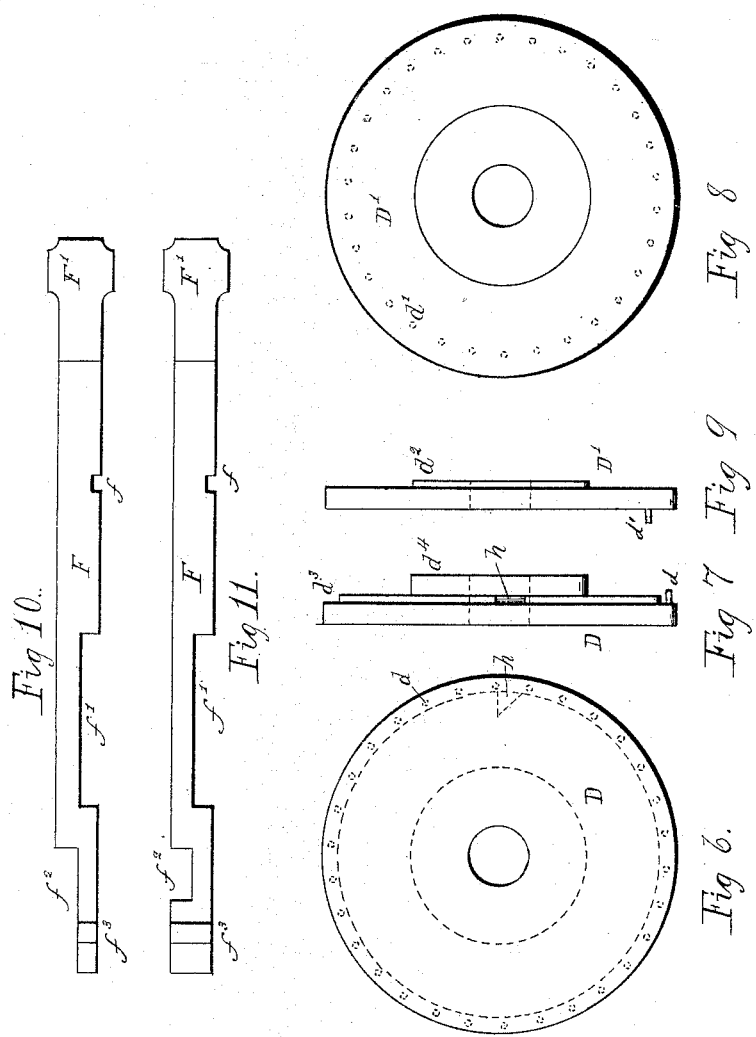
Witnesses:
E. F. Spaulding
Will Marks
Inventor.
Melvin N. Lovell
by Hallock & Hallock
Attys

UNITED STATES PATENT OFFICE.

MELVIN N. LOVELL, OF ERIE, PENNSYLVANIA, ASSIGNOR TO THE LOVELL MANUFACTURING COMPANY, LIMITED, OF SAME PLACE.

CASH REGISTER AND INDICATOR.

SPECIFICATION forming part of Letters Patent No. 489,382, dated January 3, 1893.

Application filed October 9, 1890. Renewed October 7, 1891. Serial No. 407,985. (No model.)

*To all whom it may concern:*

Be it known that I, MELVIN N. LOVELL, a citizen of the United States, residing at Erie, in the county of Erie and State of Pennsylvania, have invented certain new and useful Improvements in Cash Registering and Indicating Machines; and I do hereby declare the following to be a full, clear, and exact description of the invention, such as will enable others skilled in the art to which it appertains to make and use the same.

This invention relates to cash registering and indicating machines, and consists in certain improvements in the construction thereof as will be hereinafter fully set forth and pointed out in the claims.

Figure 1:
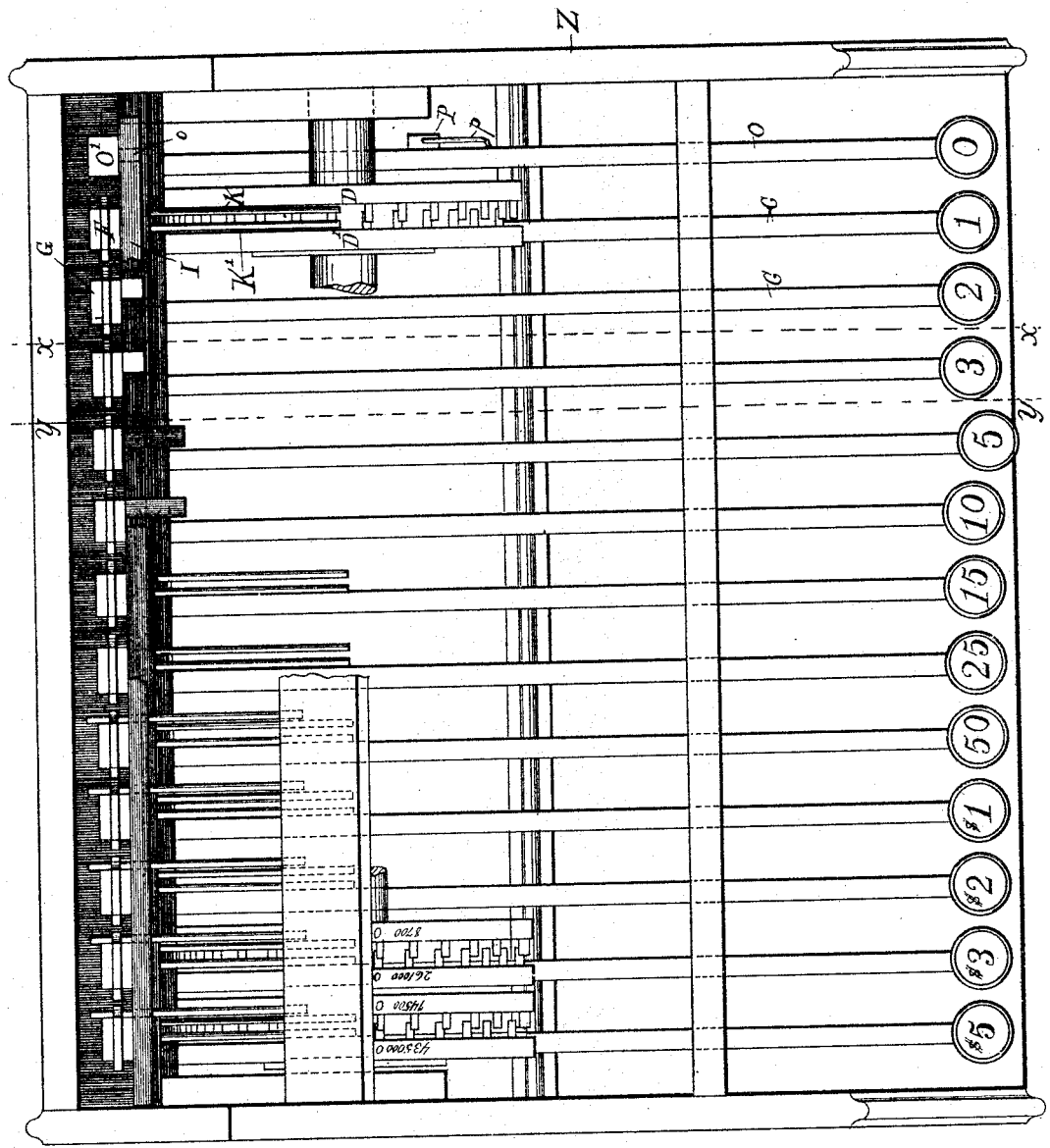
Figure 2:
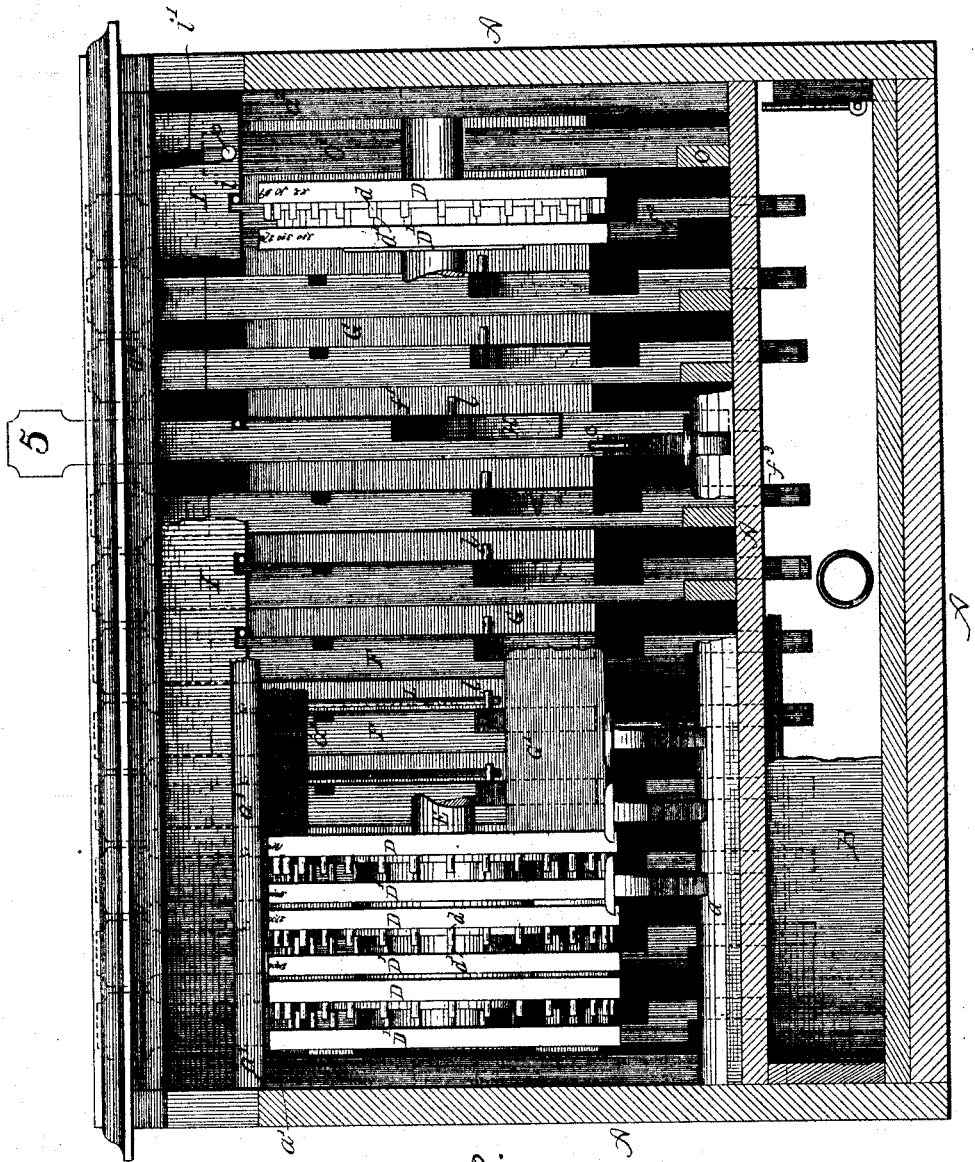
Figure 3:
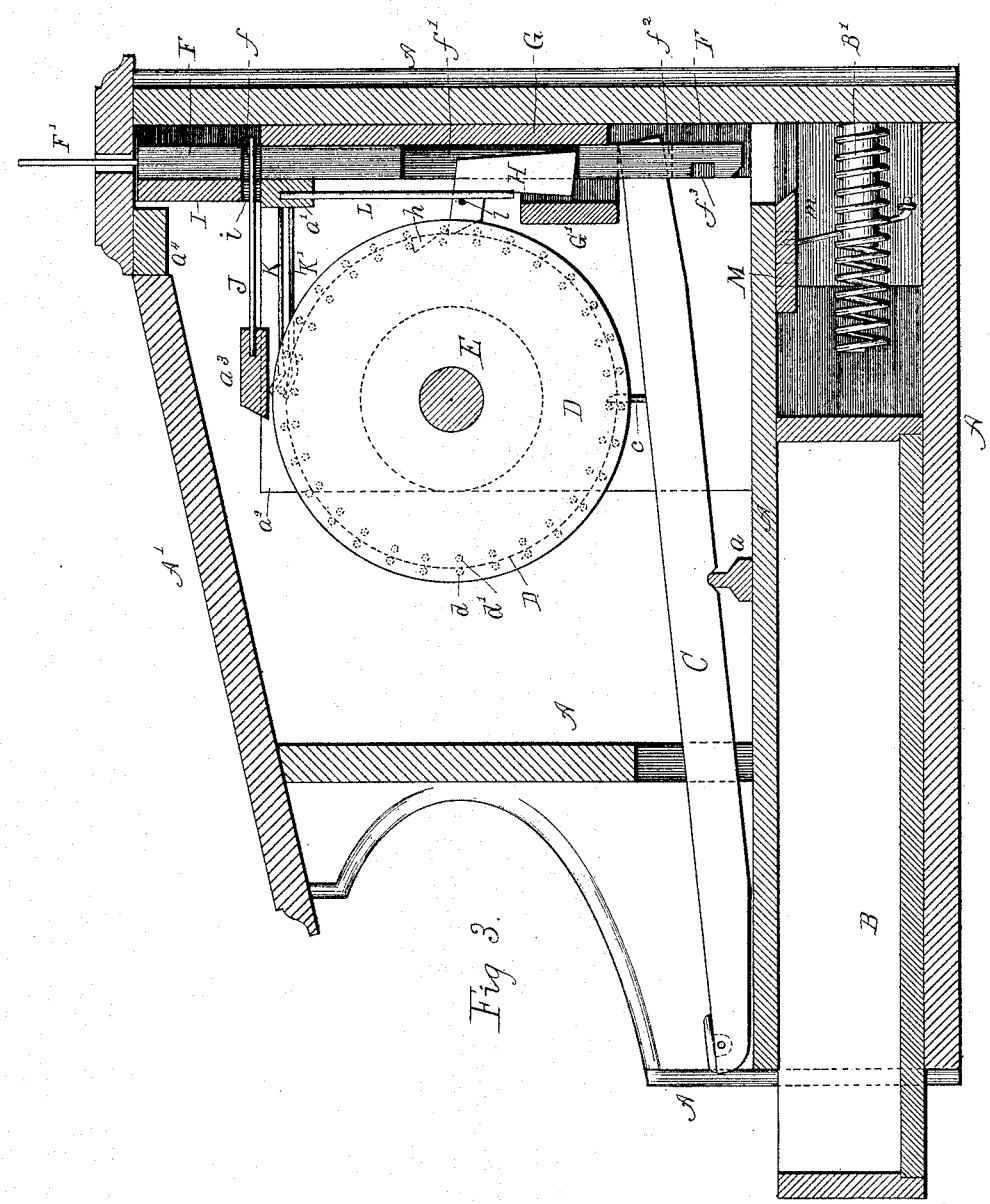
Figure 4:
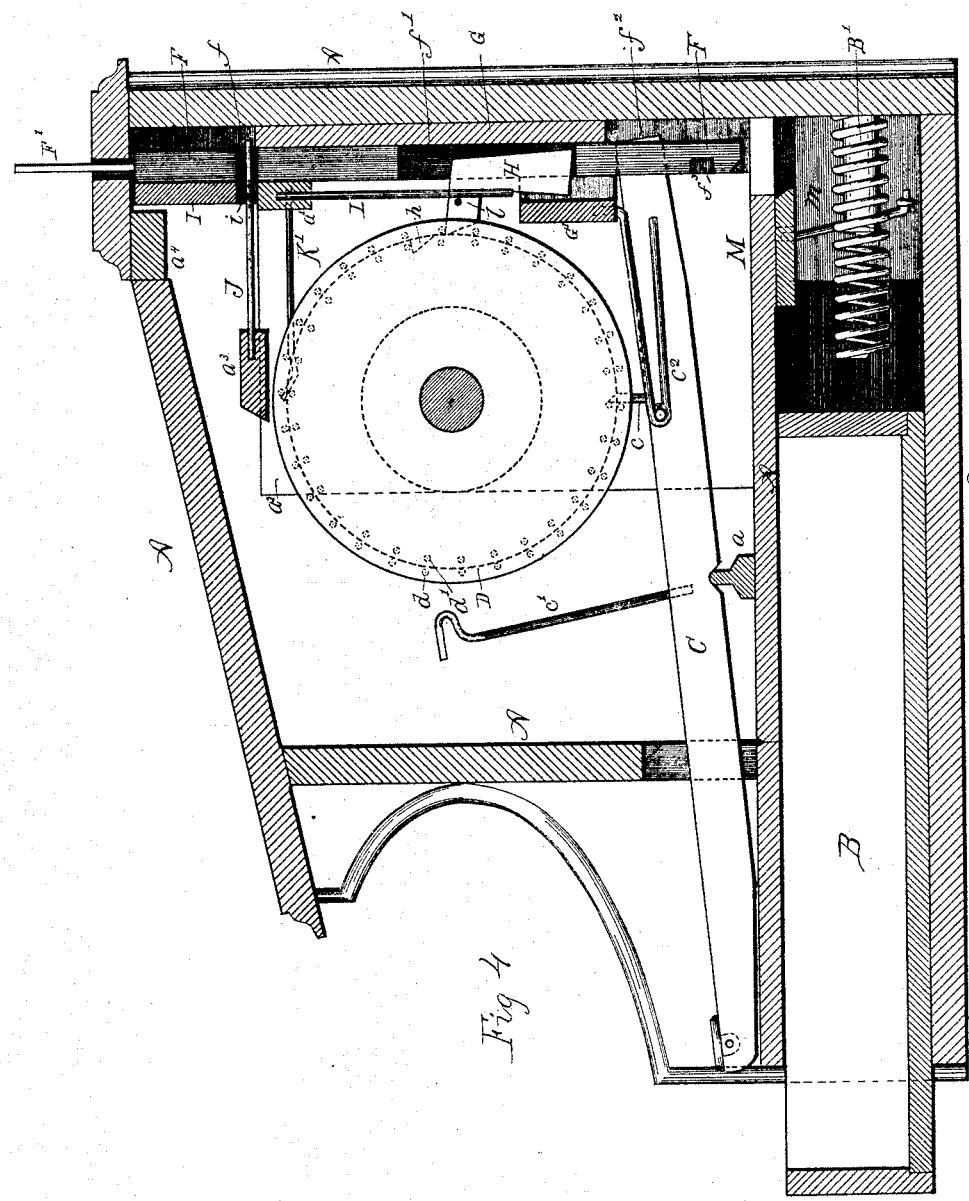
Figure 5:
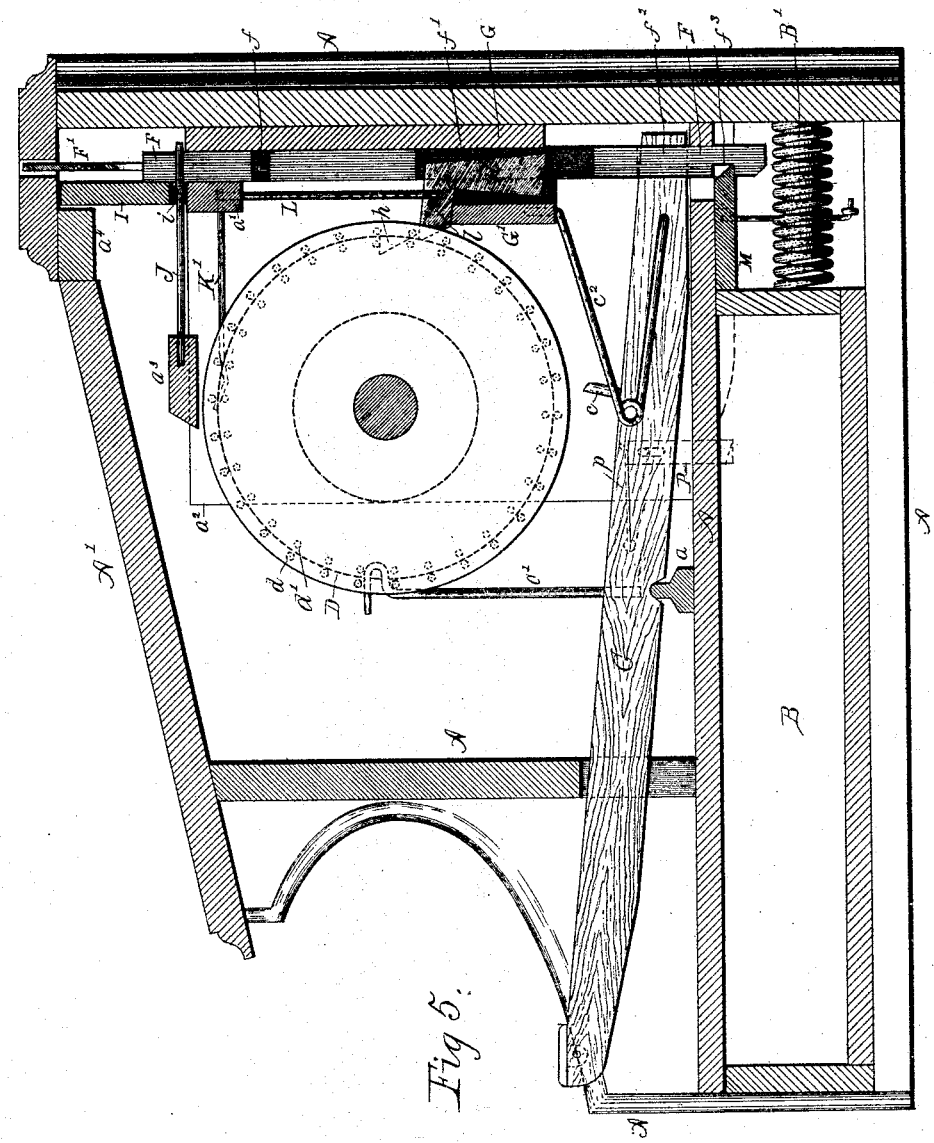

The invention is illustrated in the accompanying drawings as follows:—Figure 1,—is a plan view of the working parts of the machine with certain duplicated parts omitted and others broken away so as to show construction of parts beyond. Fig. 2,—is a longitudinal, vertical section on the line Z, Z, in Fig. 1, with the working parts generally in elevation and with certain duplicated parts omitted and other parts broken away so as to show the construction of parts beyond. Fig. 3,—is a transverse vertical section taken on the line y—y in Fig. 1, with the working parts generally in elevation. Fig. 4,—is a like view to that in Fig. 3, and shows a modification in the construction. Fig. 5,—is a transverse, sectional view taken on the line x, x, in Fig. 1, and shows the same construction as is shown in Fig. 4. The difference between the view shown in Fig. 4 and that shown in Fig. 5 is that in Fig. 4 the key lever is shown depressed and the tablet up and the drawer is open while in Fig. 5 the key is up, the tablet down and the drawer is closed. In Fig. 3 the same position of parts is shown as in Fig. 4. Fig. 6,—a side elevation of one of the primary register wheels. Fig. 7,—is an edge elevation of the same wheel. Fig. 8,—is a side elevation of one of the secondary register wheels. Fig. 9,—is an edge elevation of the same wheel. Fig. 10,—is a front view of one of the tablet rods as used in the construction shown in Figs. 2, 4 and 5. Fig. 11,—is a like view of the same part as used in the construction shown in Fig. 3.

One of the objects of my invention is to enable me to use wood for nearly all the parts of the machine, and this, together with the extreme simplicity of the construction, enables me to make a highly serviceable machine at very small cost.

The machine may have as many keys, tablets and registering wheels as desired, but, as shown, as few of these parts are used as will suffice to accomplish the indication of all amounts up to ten dollars and the registering of all amounts indicated. The keys used, as shown, are: a blank, or, as marked, a 0-key. The tablet rod of this key, as shown, has no tablet on it but it may have a tablet with any mark desired, such as "Drawer," "ticket," "check," &c. The office of this key is to open the drawer and operate the releasing devices whereby the tablet rods that are up are released and allowed to drop. There is, of course, no register wheel connected with this key. The other keys are as follows:— one cent, two cents, three cents, five cents, ten cents, fifteen cents, twenty-five cents, fifty cents, one dollar, two dollars, three dollars, five dollars.

To indicate four cents the three cent and one cent keys are depressed. To indicate seven cents the five and two cent keys may be depressed. To indicate ten dollars the five, three and two dollar keys may be used. Other amounts not represented by a single key may be similarly indicated.

All the keys except the 0-key are made to operate upon a separate primary register wheel and each primary wheel is consorted with a secondary register wheel which is moved one degree as the primary wheel is moved a complete revolution.

I make the wheels large and divide them into thirty spaces, therefore each primary wheel will register thirty indications when it has made one complete revolution and the secondary wheel will register nine hundred indications when it has made a complete revolution. To ascertain the total amount that has been indicated by all the tablets it is necessary to add together the amounts which are opposite the reading bar on all the wheels.

The method of using the machine is as follows: First depress the 0-key, this will cause the drawer to open and the displayed tablets to drop out of sight; then depress the proper numbered keys and close the drawer. When it is wanted to know the total sum received, open the case and add up the column of figures along the side of the reading bar.

From the above general description of the construction and operation of the machine the following description of the details of construction and operation will be easily understood.

A, marks the case of the machine; A′, the lid or cover.

$a$, $a'$, $a^2$ and $a^3$ are parts of the frame work.

B, is the drawer; B′, the spring by which the drawer is pushed open.

C, are the keys, or key-levers, and will be spoken of herein as keys.

D, marks the primary register wheels and D′, the secondary register wheels.

$d$ and $d'$ are ratchet pins on the sides of the respective register wheels.

F, marks the tablet rods and F′, the tablets.

G, is a grooved board or frame piece on the back of the case, in the grooves of which the tablet rods move; G′, is a like grooved piece which sets in the front of the piece G, and has its grooves register with those of the board G, so that short tubular spaces are formed. H, are pawls or dogs which set in said tubular spaces and lie within notches $f''$ in the side of the tablet rods. The inner ends of the keys set in notches $f^2$, in the sides of the tablet rods and as any key is depressed at the outer end the tablet rod connected therewith is raised and the dog H, is carried up. On the dogs H, there are pins $l$, and a long flexible pin L, made of wire, which is attached to the frame piece $a'$, stands down by the side of the dog and back of the pin $l$, and serves to keep the dog to its work on the ratchet pins on the wheels.

Extending out from the frame piece $a'$ are two brake springs, K and K′, which bear, respectively, on the wheels D and D′, and serve as a brake on each of said wheels. The wheels D and D′ are made of wood, preferably, and are loose on the shaft E. The primary wheel D, has a rabbet $d^3$ on its side and the ratchet pins $d$ are set in the vertical wall of that rabbet, and this wheel has a boss or hub $d^4$ which keeps it away from the wheel D′ which has on its opposite side a thinner boss $d^2$ for the same purpose. The pins $d'$ in the wheel D′ are on the side of the wheel facing the pins on the wheel D, and just below the plane of the horizontal wall of the rabbet $d^3$. There is a notch $h$ cut in the rabbet $d^3$ at one point. The nose of the dog H rides on the rabbet and can not come in contact with any of the pins $d'$ on the wheel D′ except when it falls into the notch $h$, there it will, as it is moved up, come in contact with one of the pins $d'$ and move the wheels D′ one degree. The notch $f'$, in the tablet rod F, in which the dog H, is held is longer than the dog, considerably, so that the rod F, may have a much longer traverse than the dog. The rod F has to move far enough to allow the tablet to appear and disappear and the tablet should be about an inch and a quarter in length; but, on the other hand, the wheels D, should not be moved but a short distance; hence the object of the long notch $f'$ and the holding of the dog in place without attaching it to the rod F.

Near the top of the tablet rod F, is a notch $f$, and extending from the reading bar $a^3$ are springs J, which will fall into the notches $f$ when the tablet bar is lifted up, and when so in place the springs will hold the rods up until they are withdrawn from the notches.

On the top of the frame-piece $a'$ and held in place by the frame piece $a^4$ is the releasing bar I, which is moved longitudinally by a pin $o$, on the lifting rod O′, which is moved by the 0-key O, said pin working in a diagonal slot $i'$ in the said bar I. Along the under side of the bar I, are notches $i$, which embrace the springs J, and when the bar I, is moved by the action of the key O, the springs J, will be pulled out of the notches $f$, and the tablet rods F, will be free to drop.

At the lower end of the tablet rods there are notches $f^3$ and at the back end of the drawer space there is a laterally sliding bar M. When the drawer is shut this bar is pushed back and when the drawer is opened it is shoved forward by a spring $m$. When this bar M, is shoved back it will enter the notches $f^3$ of all the tablet rods that are down and it will set under the ends of any rods that are up. So when the drawer is shut none of the tablets that are down can be moved until the drawer is opened.

On each key, except the 0-key, there is a pin $c$, which, when the key is depressed at its outer end will be inserted between the ratchet pins on the wheel D, as seen in Fig. 3, and prevent the wheel being turned too far by any momentum that may be imparted to it. The brake spring K, of course, tends to prevent undue momentum, but its office is to prevent the wheels turning by contact with other wheels and by jars, and the pin $c$, serves to certainly prevent the wheels turning too far by the momentum they receive by the action of the keys.

In the construction shown in Figs. 4 and 5, the inner end of the key is not held from dropping after the tablet rod is up, as in the other construction, but is provided with a spring $c^2$ for throwing it back as soon as released from pressure of the finger. To allow this action the notch $f^2$ at the lower end of the tablet rod is made open at the lower end as seen in Fig. 10. When this construction is used, the brake spring K, which acts upon the wheel D, may be omitted and a catch rod $c'$ be set into the key C, directly above its pivot, as seen in Figs. 4 and 5. When the key is depressed at its outer end the catch rod draws out of contact with the ratchet pins while the tablet rod is moving up into contact with the dog H, and when the key is released from pressure the catch rod $c'$ will be thrown back into place between the ratchet pins, and so when the tablet rod is released and allowed to drop and carry down the dog the backward action of the dog can not move the wheel backward.

In Fig. 5, a drawer catch P, is shown by dotted lines. The drawer catch is not on the key C, but on the 0-key, hence it is shown only by dotted lines, so as to illustrate its relative position. In Fig. 1, a top view of this catch P, is shown in full lines on the 0-key. The catch consists simply of a vertically moving bar, which is attached to the 0-key by a pin in a slot in the bar, so as to allow the key to move independent of the bar. When the bar is raised by the action of the key it is drawn out of a notch in the side of the drawer and as the drawer opens the bar will rest on the top of the side of the drawer. A wire spring $p$ may be applied to act upon the bar.

What I claim as new is:—

1. In a machine of the class herein named, the combination of a series of keys representing a series of amounts, a series of tablet rods carrying tablets, which represent the amount represented by the key with which they connect; a series of pairs of register wheels which are journaled loosely on a common shaft, each pair acting independently of all the others, and a dog or pawl on each of the tablet rods which acts upon the ratchet teeth of the primary register wheel of its consorted pair of register wheels at each upward movement of said tablet rod and upon the ratchet teeth of the secondary register wheel of said pair of wheels only when the primary wheel has made one complete revolution.

2. In a machine of the class herein named, the combination of the two register wheels D and D', journaled on a common shaft E, and having independent action thereon; a series of ratchet pins on the side of the wheel D, outside of the rabbet $d^3$; a like series of ratchet pins $d'$ on the side of the wheel D' facing the wheel D, and inside of the plane of the rabbet $d^3$; a notch $h$ in the side of the wheel D, which breaks the face of the rabbet $d^3$, a dog which operates upon the ratchet pins on the wheel D, and upon the ratchet pins on the wheel D', when its nose falls into the said notch $h$, a reciprocating bar carrying said dog, and a key for operating said reciprocating bar.

3. In a machine of the class herein named, the combination of the two register wheels D and D', journaled on a common shaft E, and having independent action thereon; a series of ratchet pins on the side of the wheel D, outside of the rabbet $d^3$; a like series of ratchet pins $d'$ on the side of the wheel D' facing the wheel D, and inside of the plane of the rabbet $d^3$; a notch $h$ in the side of the wheel D, which breaks the face of the rabbet $d^3$, a dog which operates upon the ratchet pins on the wheel D, and upon the ratchet pins on the wheel D' when its nose falls into the said notch $h$, a reciprocating bar carrying said dog; a key for operating said reciprocating bar and a pin $c$ on said key which serves as a lock to prevent undue movement of the wheels D and D' when the key is depressed.

4. In a machine of the class herein named, the combination of the two register wheels D and D', journaled on a common shaft E, and having independent action thereon; a series of ratchet pins on the side of the wheel D, outside of the rabbet $d^3$, a like series of ratchet pins $d'$ on the side of the wheel D' facing the wheel D, and inside of the plane of the rabbet $d^3$; a notch $h$ in the side of the wheel D, which breaks the face of the rabbet $d^3$; a dog which operates upon the ratchet pins on the wheel D, and upon the ratchet pins on the wheel D' when its nose falls into the said notch $h$; a reciprocating bar carrying said dog; a key for operating said reciprocating bar; a pin $c$ on said key which serves as a lock to prevent undue movement of the wheels D and D' when the key is depressed and a catch bar $c'$ at the fulcrum point of said key which engages the ratchet pins of said wheels when the key is in its normal position and prevents undue movement of said wheels.

5. In a machine of the class herein named, the combination with the series of tablet rods F, of the grooved block G, which provides ways for said tablet rods to move in the frame piece $a'$ which runs in front of said block and holds the tablet rods in place and the releasing bar I, seated on the top of said frame piece $a'$ and held in place by the frame piece $a^4$.

6. In a machine of the class herein named, the combination of the tablet rods F, notched at $f$, the releasing bar I, with notches $i$ opposite each tablet rod, the spring catches J, which are embraced by said notches $i$ and are deflected as said bar I, is moved one way and left free to engage with the notches $f$ when the bar I, is in its normal position.

7. In a machine of the class herein named, the combination of the tablet-rods F, notched at $f$, the releasing bar I, with notches $i$, opposite each tablet rod, the spring-catches J, which are embraced by said notches $i$, and are deflected as said bar I, is moved one way and left free to engage with the notches $f$, when the bar I, is in its normal position, and means, substantially as shown, for moving said bar I when the drawer is unlocked or opened.

8. In a machine of the class herein named, the combination of the grooved block G, and the grooved piece G', forming tubular spaces, the tablet rods F, sliding in the grooves in said block G, and having long notches $f'$ opposite said grooved piece G', and the dogs H, seated in said notches $f'$ and said tubular spaces, said dogs being of considerably less length than the notches $f$ whereby when said tablet rods are moved the full length of their traverse the dogs will be moved only a part of that distance.

9. In a machine of the class herein named, the combination of a reciprocating tablet device for indicating a certain amount; a register device for registering the sum of the amounts indicated by said tablet device and a dog for communicating motion from said tablet device to said registering device which is supported independently of said tablet device and moved by it only in the latter part of its movement, whereby the movement of the registering device will be less in degree than the movement of the indicating device.

10. In a machine of the class herein named, the combination of the sliding tablet rods having at their lower ends the notches $f^3$, the sliding catch bar M, the spring $m$ for moving said bar M, out of engagement with said notches $f^3$ and the drawer B, for moving the said bar into engagement with said notches.

11. In a machine of the class herein named, the combination of the drawer releasing key O, the lifting bar O', the releasing bar I, moved by said lifting bar, the catches J for holding up the tablet rods moved by said bar I, and the tablet rods F, notched to receive said catches J.

12. In a machine of the class herein named, the combination of the frame pieces $a^2$, $a^2$, the shaft E, supported by said frame pieces, the series of pairs of wheels journaled on said shaft, the frame piece $a^3$ over the tops of said wheels forming a reading bar, the grooved frame piece G, forming a guide for the tablet rods; the frame piece $a'$ holding the tablet rods in place and forming a bearing for the releasing bar; the frame piece $a^4$ forming a guide for said releasing bar; the grooved piece G', forming pockets for the dogs; the frame piece $a$, forming a fulcrum for the keys, the keys C, for operating the tablet rods and the dogs H, for operating the register wheels from the movement of said tablet rods.

In testimony whereof I affix my signature in presence of two witnesses.

MELVIN N. LOVELL.

Witnesses:
JNO. K. HALLOCK,
D. A. SAWDEY.